US012675506B2

(12) United States Patent
Bhatnagar et al.

(10) Patent No.: US 12,675,506 B2
(45) Date of Patent: Jul. 7, 2026

(54) SYSTEM AND METHOD FOR PROVIDING A CENTRALIZED NETWORK MASTER DATABASE LAKE FOR NETWORK NODES

(71) Applicant: JIO PLATFORMS LIMITED, Ahmedabad (IN)

(72) Inventors: Aayush Bhatnagar, Navi Mumbai (IN); Pradeep Kumar Bhatnagar, Navi Mumbai (IN); Sundaresh Sankaran, Mumbai (IN); Haresh B Ambaliya, Bhundani (IN); Sandeep Rawat, Pauri Garhwal (IN); Harendra Jadon, Indore (IN); Vikram Singh, Navi Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/992,291

(22) PCT Filed: Jun. 3, 2024

(86) PCT No.: PCT/IN2024/050672
§ 371 (c)(1),
(2) Date: Jan. 8, 2025

(87) PCT Pub. No.: WO2025/004093
PCT Pub. Date: Jan. 2, 2025

(65) Prior Publication Data
US 2026/0010550 A1    Jan. 8, 2026

(30) Foreign Application Priority Data

Jun. 29, 2023    (IN) ............................. 202321043825

(51) Int. Cl.
*G06F 16/28* (2019.01)
*G06F 16/23* (2019.01)
*G06F 16/29* (2019.01)

(52) U.S. Cl.
CPC ........ *G06F 16/287* (2019.01); *G06F 16/2379* (2019.01); *G06F 16/29* (2019.01)

(58) Field of Classification Search
CPC ..... G06F 16/287; G06F 16/29; G06F 16/2379
See application file for complete search history.

(56) References Cited

U.S. PATENT DOCUMENTS 8,775,433 B2 * 7/2014 Green ................. G06F 16/2228
707/741
10,769,193 B2 * 9/2020 Bouillet ............... G06F 16/355
(Continued)

FOREIGN PATENT DOCUMENTS

WO    2025004093 A1    1/2025

OTHER PUBLICATIONS

International Search Report and Written Opinion of application No. PCT/IN2024/050672 mailed on Aug. 30, 2024, 10 pages.

*Primary Examiner* — Etienne P Leroux
(74) *Attorney, Agent, or Firm* — FINNEGAN, HENDERSON, FARABOW, GARRETT & DUNNER LLP

(57) ABSTRACT

The present invention discloses a method for providing a centralized network master database lake (128). The method receives and stores input data, identifies a plurality of attributes associated with the input data, processes the input data to categorize the input data into a plurality of predefined data categories based on the plurality of attributes, and processes the categorized input data to determine if a record associated with the categorized input data exist in the centralized network master database lake (128). The method (1200) updates the record with the categorized input data (Continued)

when it is determined that the record exists, creating a new record to store the categorized input data into the centralized network master database lake (128) when it is determined that the record does not exist and processing the record to dynamically display the categorized input data.

15 Claims, 14 Drawing Sheets

(56) References Cited

U.S. PATENT DOCUMENTS

| | | | |
|---|---|---|---|
| 11,379,445 B2 | 7/2022 | Seth et al. | |
| 2010/0174693 A1 | 7/2010 | Chandrasekhara et al. | |
| 2010/0185540 A1* | 7/2010 | Hahn-Carlson | G06Q 20/10 |
| | | | 705/40 |
| 2014/0013400 A1* | 1/2014 | Warshavsky | H04L 63/10 |
| | | | 726/4 |
| 2014/0244631 A1* | 8/2014 | Arthur | G06F 16/43 |
| | | | 707/723 |
| 2018/0045614 A1* | 2/2018 | Oelke | G01M 99/008 |
| 2025/0023791 A1* | 1/2025 | Reeves | H04L 41/145 |

* cited by examiner

100C

400

900

DASHBOARDS

| OWNER | CREATED BY | STATUS | FAVORITE | CERTIFIED | |
|---|---|---|---|---|---|
| SELECT OR TYPE A VALUE ∨ | SELECT OR TYPE A VALUE ∨ | SELECT OR TYPE A VALUE ∨ | SELECT OR TYPE A VALUE ∨ | SELECT OR TYPE A VALUE ∨ | |
| SEARCH | | | | | |
| SNAPSHOT | | | | | |

| TITLE | MODIFIED BY : | STATUS | MODIFIED BY | CREATED BY | OWNERS |
|---|---|---|---|---|---|
| PE-SNAPSHOT | Joe | PUBLISHED | 2 DAYS AGO | Joe | |
| SNAPSHOT: 4G MACRO SITES | Dane | PUBLISHED | A MONTH AGO | Dane | |
| SNAPSHOT: WI-FI | Joe | DRAFT | A MONTH AGO | Joe | |
| SNAPSHOT: 5G SITES SUMMARY | Dane | DRAFT | A MONTH AGO | Dane | |

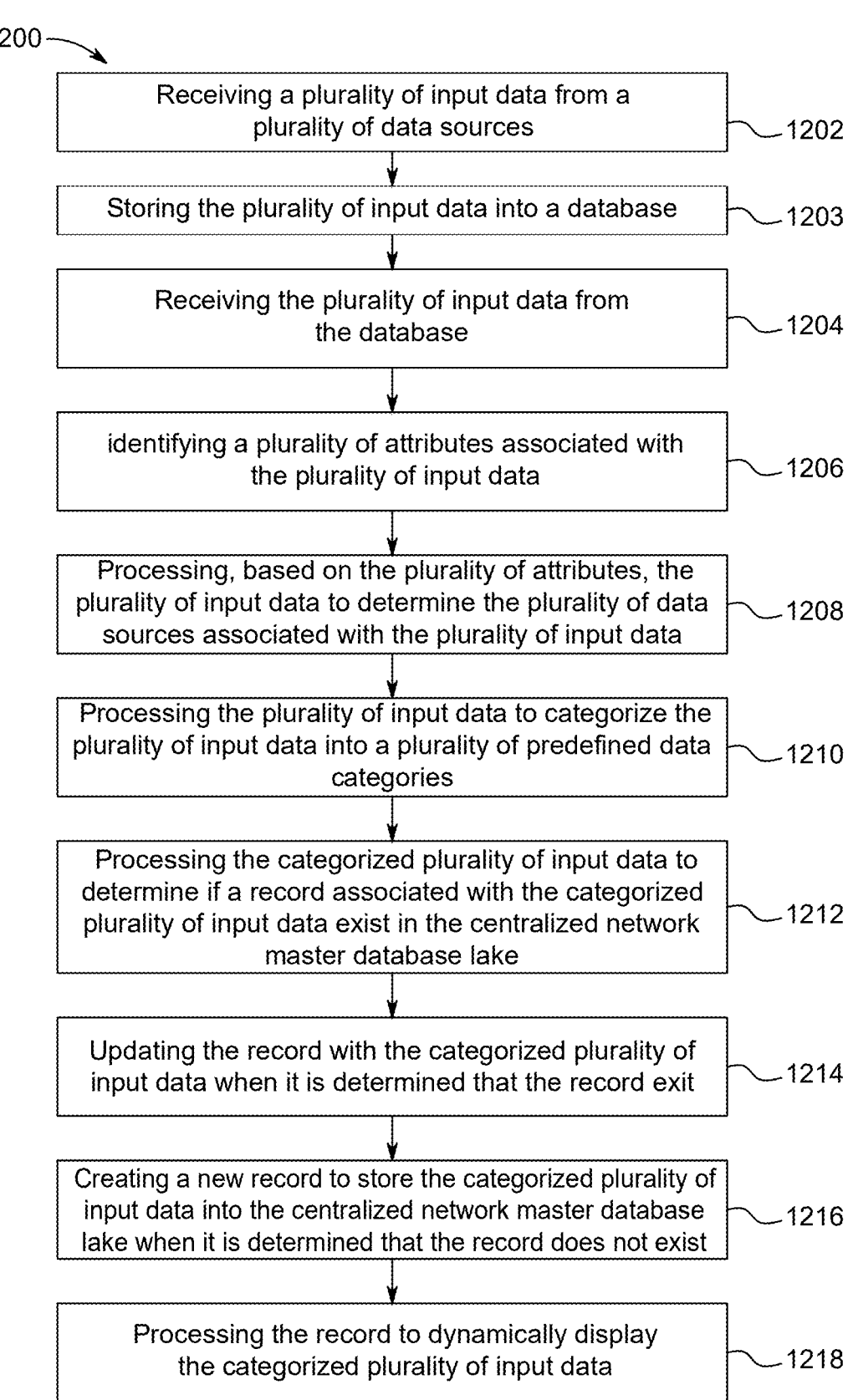

Receiving a plurality of input data from a plurality of data sources —1202

Storing the plurality of input data into a database —1203

Receiving the plurality of input data from the database —1204 identifying a plurality of attributes associated with the plurality of input data —1206

Processing, based on the plurality of attributes, the plurality of input data to determine the plurality of data sources associated with the plurality of input data —1208

Processing the plurality of input data to categorize the plurality of input data into a plurality of predefined data categories —1210

Processing the categorized plurality of input data to determine if a record associated with the categorized plurality of input data exist in the centralized network master database lake —1212

Updating the record with the categorized plurality of input data when it is determined that the record exit —1214

Creating a new record to store the categorized plurality of input data into the centralized network master database lake when it is determined that the record does not exist —1216

Processing the record to dynamically display the categorized plurality of input data —1218

FIG. 12

SYSTEM AND METHOD FOR PROVIDING A CENTRALIZED NETWORK MASTER DATABASE LAKE FOR NETWORK NODES

RESERVATION OF RIGHTS

A portion of the disclosure of this patent document contains material, which is subject to intellectual property rights such as, but are not limited to, copyright, design, trademark, Integrated Circuit (IC) layout design, and/or trade dress protection, belonging to Jio Platforms Limited (JPL) or its affiliates (herein after referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

TECHNICAL FIELD

The present disclosure relates to wireless communications, and specifically to a system and a method for improving network operations by using a centralized network master database lake.

BACKGROUND

The following description of related art is intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Typically, in a wireless cellular network, where radiating nodes meant for providing services are deployed in spatially distributed manner targeted for the specific geography. However, managing an entire lifecycle of the network/the node is a challenge due to broadly three reasons: a) scale of deployment, i.e., a large number of nodes are present on a particular big geography, b) multiple phases are involved in a lifecycle of the nodes, ranging from planning, deployment, operations, and decommissioning, and c) lack of availability of a unified platform for observability on the nodes.

Prevalent commercial cellular networks generally offer services through multiple technologies using equipment from various original equipment manufacturers (OEMs). Before commercial readiness, each of the network nodes passes from multiple deployment phases such as initial planning, site survey, construction readiness, installation, commissioning, acceptance test, regulatory submission, and the like. Observability on currently live nodes is available on the OEMs; however, due to the availability of the multiple OEMs, information is not available on a single consolidated platform and is highly distributed across multiple platforms, which acts as a bottleneck for determining complete information.

There is, therefore, a need in the art for an improved mechanism to provide a centralized network master database lake to build a variety of use cases using the information.

Definition

As used in the present disclosure, the following terms are generally intended to have the meaning as set forth below, except to the extent that the context in which they are used to indicate otherwise.

The term OSS as used herein, refers to an operational support system. The OSS is the backend information technology infrastructure that allows telecommunication companies and other communication service providers (CSPs) to create, organize, provision, maintain, and manage network services and orders.

The term physical cell identity as used herein, refers to physical cell identity. The PCI is a physical layer cell identifier in 4G long term evolution (LTE) and 5G new radio (NR) used to indicate the physical identity of a cell during the cell selection procedure. PCI is used for downlink synchronization. This makes PCI planning one of the most important steps in 4G LTE and 5G NR network design and construction.

The term TAC as used herein, refers to tracking area code. The TAC consisting of 16 bits. This is an identifier for the tracking area and is unique within a public land mobile network (PLMN). Tracking Area Identifier (TAI): this is a globally unique tracking area identifier, made up of the PLMN ID and the TAC.

OBJECTS OF THE PRESENT DISCLOSURE

It is an object of the present disclosure to improve network operations by using a centralized network data master database.

It is an object of the present disclosure to enable integration of planning structure, workorder structure and network operations support systems (OSS) in a single module.

It is an object of the present disclosure to categorize planning structures into site level and map data.

It is an object of the present disclosure to categorize the dataset of Plan to Build (P2B) system into workorder data and cell data.

It is an object of the present disclosure to provide a 360-degree view on a centralized network master database lake using reporting, Business Intelligence (BI) tools and a map view.

It is an object of the present disclosure to be used in a commercial network having multiple nodes and involving multi-vendor, multi-technology scenarios.

It is an object of the present disclosure to improve network operations by creating a centralized network data master database by tapping crucial data from multiple external sources.

It is an object of the present disclosure to provide the centralized network data master database that is used as a base data for empowering features like network view for sites and coverage for managing the network.

It is an object of the present disclosure to provide the centralized network data master database that acts as a platform for performing analytics functions and building use cases.

It is an object of the present disclosure to provide various databases in a single platform and ease development of automation use cases.

SUMMARY

In an exemplary embodiment, the present invention discloses a system for providing a centralized network master database lake. The system includes a receiving unit configured to receive a plurality of input data from a plurality of data sources. The system includes a database configured to store the plurality of input data. The system includes a processing unit configured to receive the plurality of input data from the database. The processing unit is configured to identify a plurality of attributes associated with the plurality of input data. The processing unit is configured to process, based on the plurality of attributes, the plurality of input data to determine the plurality of data sources associated with the plurality of input data. The processing unit is configured to process the plurality of input data to categorize the plurality of input data into a plurality of predefined data categories. The processing unit is configured to process the categorized plurality of input data to determine if a record associated with the categorized plurality of input data exist in the centralized network master database lake. The processing unit is configured to update the record with the categorized plurality of input data when it is determined that the record exists. The processing unit is configured to create a new record to store the categorized plurality of input data into the centralized network master database lake when it is determined that the record does not exist. The processing unit is configured to process the record to dynamically display the categorized plurality of input data. In an embodiment, the data is getting categorized using data attributes. For example, if the input data contains latitude, longitudes, then the input data is categorized as map related data and if the input data contains site identifiers (IDs), then the input data is categorized into the site related data.

In some embodiments, the plurality of input data is categorized as a site-related data or as a map-related data when the data source from the plurality of data sources is a planning database.

In some embodiments, when the input data is categorized as the site related data, then performing the following steps preprocessing the site related data, storing the pre-processed site related data in at least one relational database, and storing the pre-processed site related data in the centralized network master database lake.

In some embodiments, when the input data is categorized as the map related data, then performing the following steps preprocessing the map related data, storing the pre-processed map related data in at least one non-relational database, and storing the pre-processed map related data in the centralized network master database lake.

In some embodiments, the system is further configured to filter the site related data to get a site list comprising a plurality of site records.

In some embodiments, the system is further configured to determine a modified date and a created date for every site record in the site list.

In some embodiments, the system is further configured to identify a modified site record and a new site record from the site list based on the determined modified date and the determined created date respectively.

In some embodiments, the system is further configured to determine an existing site record from the site related data associated with the identified modified site record.

In some embodiments, the system is further configured to update the determined existing site record with details of the modified site record.

In some embodiments, the system is further configured to insert the identified new site record in the at least one relational database.

In some embodiments, the system is further configured to categorize the plurality of input data as a workorder data or as a cell data when a data source from the plurality of data sources is a plan to build (P2B) system.

In some embodiments, the system is further configured to determine if the cell data is a cell physical data or a cell-level soft data.

In some embodiments, the system is further configured to update the centralized network master database lake with the workorder data and the cell physical data.

In some embodiments, the system is further configured to update the centralized network master database lake with the cell level soft data when it is determined that a cell associated with the cell level soft data is not active and not present in a network operations support system (OSS). In some embodiments, the plurality of input data is categorized as an event-based data or as a periodic based data when the data source is the network OSS.

In an exemplary embodiment, the present invention discloses a method for providing a centralized network master database lake. The method includes receiving a plurality of input data from a plurality of data sources by a receiving unit. The method includes storing the input data in a database. The method includes receiving the plurality of input data from the database by a processing unit. The method includes identifying a plurality of attributes associated with the plurality of input data. The method includes processing, based on the plurality of attributes, the plurality of input data to determine the plurality of data sources associated with the plurality of input data. The method includes processing the plurality of input data to categorize the plurality of input data into a plurality of predefined data categories. The method includes processing the categorized plurality of input data to determine if a record associated with the categorized plurality of input data exist in the centralized network master database lake. The method includes updating the record with the categorized plurality of input data when it is determined that the record exists. The method includes creating a new record to store the categorized plurality of input data into the centralized network master database lake when it is determined that the record does not exist. The method includes processing the record to dynamically display the categorized plurality of input data.

In an embodiment, the plurality of input data is categorized as a site related data or as a map related data when a data source from the plurality of data sources is a planning database.

In an embodiment, when the plurality of input data is categorized as the site related data, then performing the following steps: preprocessing the site related data, storing the pre-processed site related data in at least one relational database, and storing the pre-processed site related data in the centralized network master database lake.

In an embodiment, when the plurality of input data is categorized as the map related data, then performing the following steps: preprocessing the map related data storing the pre-processed map related data in at least one non-relational database and storing the pre-processed map related data in the centralized network master database lake.

In an embodiment, the method further comprising filtering the site related data to get a site list comprising a plurality of site records.

In an embodiment, the method further comprising determining a modified date and a created date for every site record in the site list.

In an embodiment, the method further comprising identifying a modified site record and a new site record from the site list based on the determined modified date and the determined created date respectively.

In an embodiment, the method further comprising determining an existing site record from the site related data associated with the identified modified site record.

In an embodiment, the method further comprising updating the determined existing site record with details of the modified site record.

In an embodiment, the method further comprising inserting the identified new site record in the at least one relational database.

In an embodiment, the method further comprising categorizing the plurality of input data as a workorder data or as a cell data when a data source from the plurality of data sources is a plan to build (P2B) system.

In an embodiment, the method further comprising determining if the cell data is a cell physical data or a cell level soft data.

In an embodiment, the method further comprising updating the centralized network master database lake with the workorder data and the cell physical data.

In an embodiment, the method further comprising updating the centralized network master database lake with the cell level soft data when it is determined that a cell associated with the cell level soft data is not active and not present in a network operations support system (OSS).

In an embodiment, the plurality of input data is categorized as an event based data or as a periodic based data when a data source from the plurality of data sources is the network OSS.

BRIEF DESCRIPTION OF THE DRAWINGS

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

The diagrams are for illustration only, which thus is not a limitation of the present disclosure, and wherein:

FIG. 9 illustrates a dashboard created on datasets from the centralized network master database lake, in accordance with an embodiment of the disclosure.

FIG. 12 illustrates an exemplary flow diagram for a method for providing a centralized network master database lake, in accordance with an embodiment of the disclosure.

LIST OF REFERENCE NUMERALS

Figure 1A:
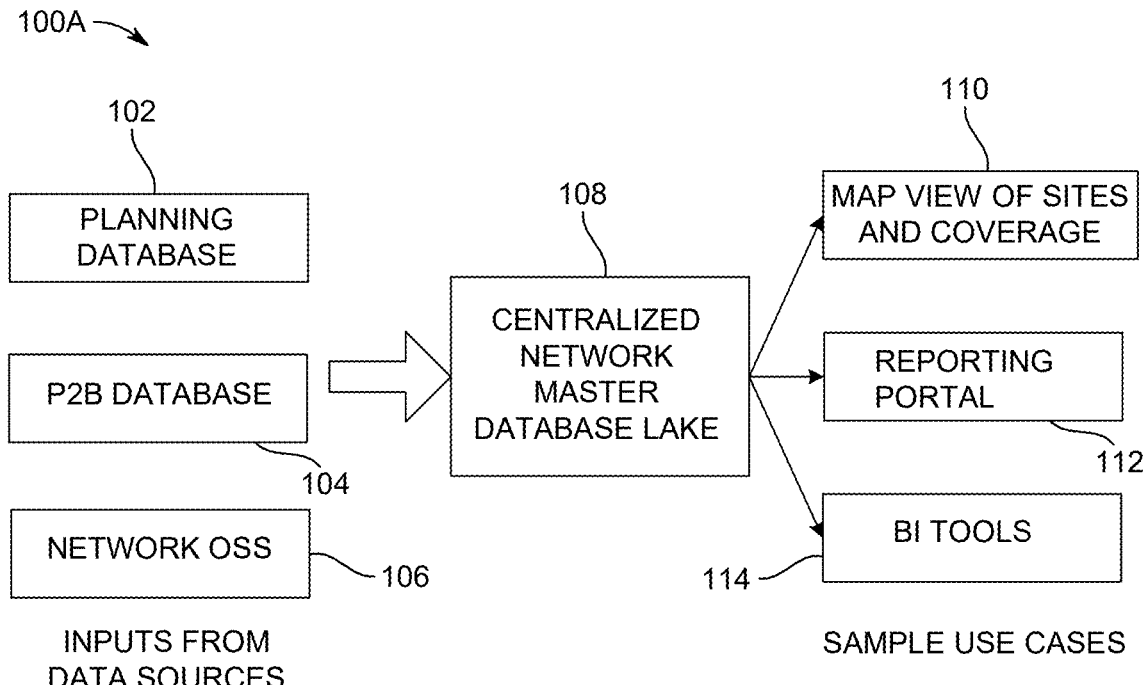
FIG. 1A illustrates a broad level architecture of a centralized network master database lake, in accordance with an embodiment of the disclosure.

100A—Centralized network master database lake architecture
100B—System architecture
100C—Network architecture
116—Data sources
118—System
120—Receiving unit
122—Processing unit
124—Database
126—Interfacing unit
128—Centralized network master database lake
130—gNodeB
132—User equipment (UE)
134—Network
200—Flow Diagram
300—Flow Diagram
400—Flow Diagram
500—Flow Diagram
600—Flow Diagram
700—Flow Diagram
800—An exemplary reporting wizard tool
900—An exemplary dashboard
1000—An exemplary map showing site and coverage view
1100—A computer system
1120—Bus
1130—Main Memory
1140—Read Only Memory
1150—Mass Storage Device
1160—Communication Port
1170—Processor
1200—Flow Diagram

DETAILED DESCRIPTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Reference throughout this specification to "one embodiment" or "an embodiment" or "an instance" or "one instance" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The disclosed system and method are applicable to 2G, 3G, 4G, 5G, 6G technologies, and beyond all generations of mobile technology with multiple bands and carriers of telecom operators. The disclosed system and method facilitate the creation of a centralized network master database lake to improve network operations and may be implemented in any commercial network involving multi-vendor, multi-technology scenarios. The centralized network master database lake may be used as a base data for empowering other features such as network view for sites and coverage for managing the network. The centralized network master database lake may be integrated with all types of management systems (MS), workorder systems and any other planned databases. The centralized network master database lake may take feed from a geographical information system (GIS) which is a planning database, a site workorder application, and all other available network MSs. The feeds may be used to keep all information up to date at one common platform. The centralized network master database lake is further used to build a variety of use cases such as centralized network site layers, reporting and dashboard visualizations. Information gathered on the centralized network master database lake is required to track pre-on Air stages for efficient tracking.

The disclosed system and method facilitate the provision of a centralized network master database for improving network operations and enabling other automation use cases by enabling planning and deployment of the latest attributes from operations support systems (OSS). Further, the disclosed system and method discloses a mechanism on how datasets may be divided and grouped together. In addition, the disclosed system and method discloses an abstract model so that all external systems may be integrated. Also, the disclosed system and method creates an inhouse web portal for a reporting framework and provides an integrated open-source tool for advanced business information (BI) activities.

FIG. 1A illustrates a broad-level architecture (100A) of the centralized network master database lake (108) in accordance with an embodiment of the disclosure. Typically, operators use a variety of tools and platforms which store network information at different stages. The input stage is categorized into three different categories. The first category is a planning database structure (102) that usually contains information related to nominal planning such as a nominal identifier (ID), search ring, initial candidate list, final candidate list, planned coordinate, planned solution (small cell, macro cell), planned backhaul, deployment phase, and all administrative boundaries details. The second category is a Plan to Build (P2B) database system (104). Once the nominal is finalized and is suitable to go for a site built, then all deployment related tasks are tracked in the P2B system. This involves capturing information for different site milestones such as "installation", "commissioning", "acceptance test", "cluster tests", and the like. Also, all physical parameters and planned cell configurations are maintained in the P2B system. The network OSS (106) refers to a controller of all live sites. In any original equipment manufacturer (OEM) deployment, all nodes are grouped and controlled by one master or group of masters for the purpose of operations and management. Once the site is up and radiating, then the network OSS may give visibility on all site/cell level parameters through key performance indicators (KPIs) and configuration parameters. An operator uses multi-vendor radio nodes, so all OEMs related structures are put under this category. These systems provide live information on radiating sites in the network. Further, the centralized network master database lake (108) leverages the latest performance events and configures events to maintain the site status and other attributes such as cell identifier (ID), PCI, tracking area code (TAC), and the like.

The next category includes a centralized network master database lake (108) structure (centralized database lake). This structure basically collects, filters, transforms, and stores the attributes from the multiple systems to form a centralized network master database lake. Table 1 includes collected exemplary key attributes.

TABLE 1

Collected exemplary key attributes

| Data Category | Attribute Name | External Source Type |
|---|---|---|
| Geographical Details | State | Planning Database |
| | Maintenance point (MP) Name | |
| | Geographical Circle Name | |
| | Lattitude | |
| | Longitude | |
| Project Details | Phase | Planning Database |
| | Planned Band | |
| | Planned Connectivity | |
| Civil Infrastructure Details | Site Type | P2B Systems |
| | Infrastructure provider (IP) name | |
| | Tower Type | |
| | Tower Structure Type | |
| | Tower High | |
| | Tower Wind Load | |
| Electrical Infrastructure Details | Rack | P2B Systems |
| | Switched-mode power supply (SMPS) | |
| | Battery | |
| | Diesel generator (DG) | |
| | Earthing | |
| | Electrical board (EB) | |
| | (Sanctioned Load) | |
| Infrastructure Details | eNodeB Hardware - CDU/RDU/remote radio head (RRH)/SMPS | P2B Systems |
| | Internet service provider (ISP) Router - CSS/AG1 | |
| | Long term evolution (LTE) | |
| | Antenna Model, Height, azimuth | |
| | MV Antenna - Size, Height, Azimuth | |
| OSS Details | Cell equipped status | Network OSS |
| | Cell parameters such as cell ID, PCI, TAC, RC power, etc. | |

The enriched data in the centralized network master database lake may be potentially used for a variety of use cases. One of the sample use cases is that of a map view of sites and coverage (110). Once the data is available in the centralized network master database lake (108), the same is rendered for providing an updated network view. Another sample use case is that of a reporting framework. Here all datasets may be exported by the user from a reporting portal (112) (wizard) in the web application. The next sample use case is that of performing advanced analytics through business intelligence (BI) tools (114). Any BI platform may be integrated with the centralized network master database lake (108).

Figure 1B:
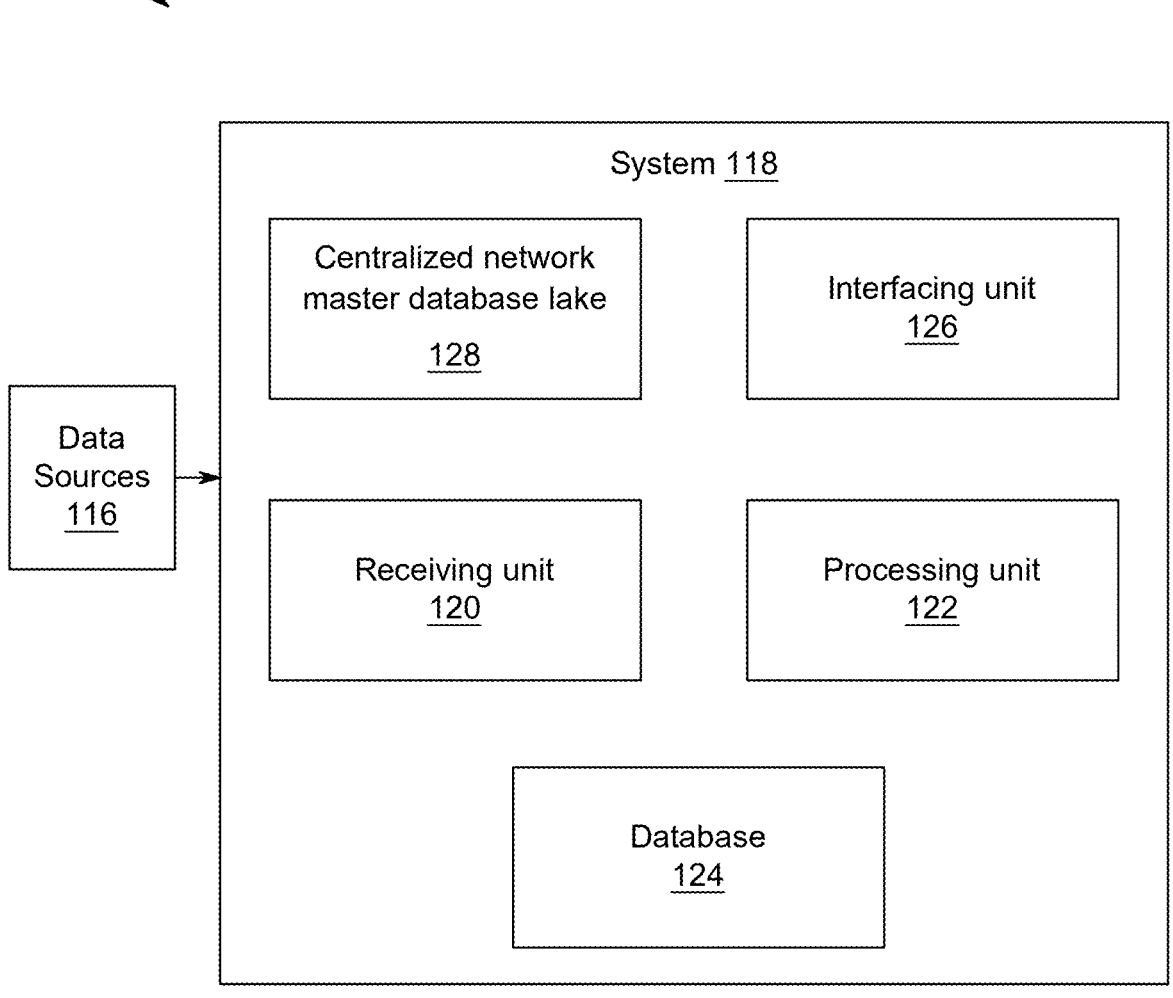
FIG. 1B illustrates a system architecture for providing a centralized network master database lake, in accordance with an embodiment of the disclosure.

FIG. 1B illustrates a system architecture (100B) for providing a centralized network master database lake, in accordance with an embodiment of the disclosure.

In an aspect, the system (118) may include a receiving unit (120), a processing unit (122), a database (124), an interfacing unit (126), and a centralized network master database lake (128). The system (118) may be connected to a plurality of data sources (116). The receiving unit (120) is configured to receive a plurality of input data from the plurality of data sources (116). The database (124) is configured to store the plurality of input data (e.g., site related data and map related data, etc). The centralized network master database lake (128) is updated with all the incoming data in real-time to keep all information up to date on one common platform. The centralized network master database lake (128) is updated with the plurality of cell-level attributes. The processing unit (122) may be implemented as one or more microprocessors, microcomputers, microcontrollers, digital signal processors, central processing units, logic circuitries, and/or any devices that process data based on operational instructions. Among other capabilities, the processing unit (122) may be configured to fetch and execute computer-readable instructions stored in a memory of the system (118). The memory may be configured to store one or more computer-readable instructions or routines in a non-transitory computer readable storage medium, which may be fetched and executed to create or share data packets over a network service. The memory may comprise any non-transitory storage device including, for example, volatile memory such as random-access memory (RAM), or non-volatile memory such as erasable programmable read only memory (EPROM), flash memory, and the like.

In an embodiment, the system (118) may include the interfacing unit (126). The interfacing unit (126) may comprise a variety of interfaces, for example, interfaces for data input and output devices (I/O), storage devices, and the like. The interfacing unit (126) may facilitate communication through the system (118). The interfacing unit (126) may also provide a communication pathway for one or more components of the system (118).

Figure 1C:
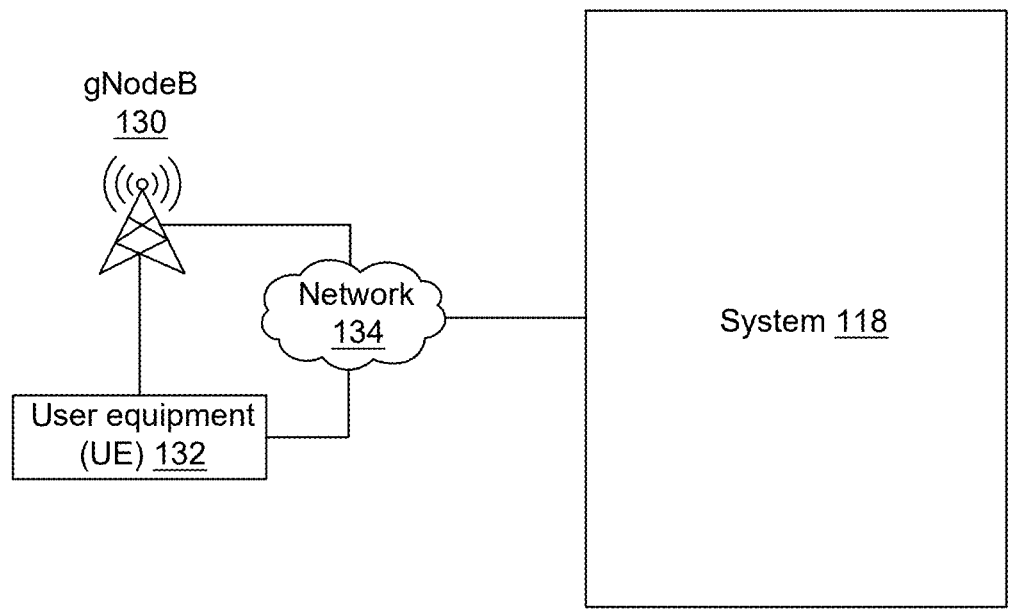
FIG. 1C illustrates a network architecture for providing a centralized network master database lake, in accordance with an embodiment of the disclosure.

FIG. 1C illustrates a network architecture (100C) for providing a centralized network master database lake, in accordance with an embodiment of the disclosure.

Referring to FIG. 1C, the network architecture (100C) may include a user equipment UE (132) and a gNodeB (130) (e.g. a network node). In 5G networks, gNodeB stands for "Next Generation Node B". The gNodeB is essentially the equivalent of the eNodeB in LTE (4G) networks. The gNodeB is the base station component in the 5G radio access network (RAN) responsible for radio communication with the UE. A person of ordinary skill in the art will appreciate that the terms "computing device(s)" and "user equipment" may be used interchangeably throughout the disclosure. Although a single UE (132) is depicted in FIG. 1C, however, any number of the UEs may be included without departing from the scope of the ongoing description.

In an embodiment, the UE (132) may include smart devices operating in a smart environment, for example, an Internet of Things (IoT) system. In such an embodiment, the UE (132) may include, but is not limited to, smart phones, smart watches, smart sensors (e.g., mechanical, thermal, electrical, magnetic, etc.), networked appliances, networked peripheral devices, networked lighting system, communication devices, networked vehicle accessories, networked vehicular devices, smart accessories, tablets, smart television (TV), computers, smart security system, smart home system, other devices for monitoring or interacting with or for the users and/or entities, or any combination thereof. A person of ordinary skill in the art will appreciate that the UE (132) may include, but is not limited to, intelligent, multi-sensing, network-connected devices, that can integrate seamlessly with each other and/or with a central server or a cloud-computing system or any other device that is network-connected.

In an embodiment, the UE (132) may include, but is not limited to, a handheld wireless communication device (e.g., a mobile phone, a smart phone, a tablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, and the like. In an embodiment, the UE (132) may include, but is not limited to, any electrical, electronic, electro-mechanical, or an equipment, or a combination of one or more of the above devices such as virtual reality (VR) devices, augmented reality (AR) devices, laptop, a general-purpose computer, desktop, personal digital assistant, tablet computer, mainframe computer, or any other computing device, the UE (132) may include one or more in-built or externally coupled accessories including, but not limited to, a visual aid device such as a camera, an audio aid, a microphone, a keyboard, and input devices for receiving input from the user (102) or the entity such as touch pad, touch enabled screen, electronic pen, and the like. A person of ordinary skill in the art will appreciate that the UE (132) may not be restricted to the mentioned devices and various other devices may be used.

The UE (132) may communicate with the system (118), through a network (134). In an embodiment, the network (134) may include at least one of a Second Generation (2G), Third Generation (3G), Fourth Generation (4G) network, a Fifth Generation (5G) network, Sixth Generation (6G) and beyond or the like. The network (134) may enable the user equipment (132) to communicate with other devices in the network architecture (100C) and/or with the system (118). The network (134) may include a wireless card or some other transceiver connection to facilitate this communication. In another embodiment, the network (134) may be implemented as or include any of a variety of different communication technologies such as a wide area network (WAN), a local area network (LAN), a wireless network, a mobile network, a Virtual Private Network (VPN), the Internet, the Public Switched Telephone Network (PSTN), or the like. The UE (132) may be communicatively coupled with the network (134). The communicatively coupling comprises of receiving, from the UE, a connection request by the network, sending an acknowledgment of the connection request to one or more network elements, and transmitting a plurality of signals in response to the connection request.

Figure 2:
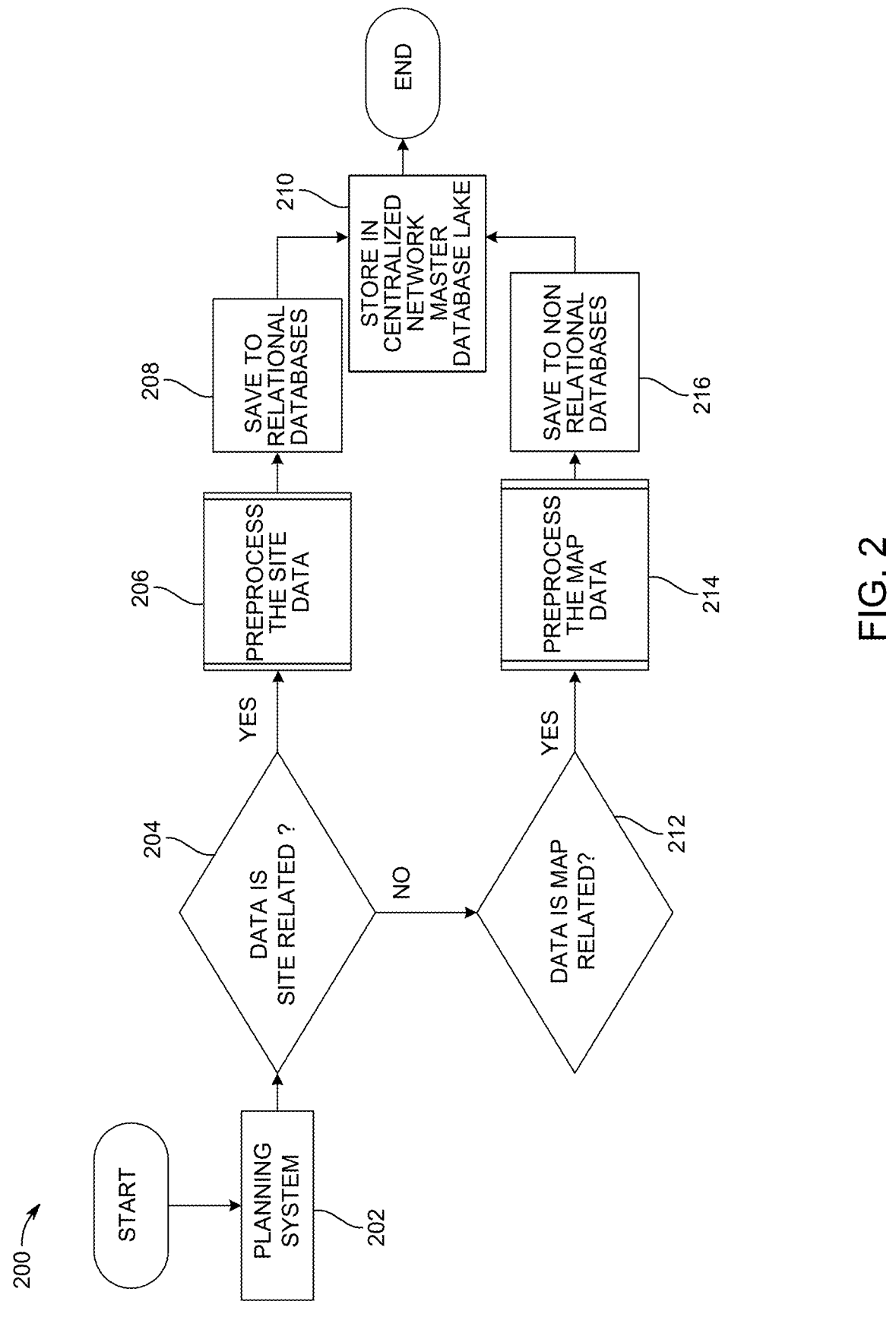
FIG. 2 illustrates an ingestion process for ingesting data from a planning database structure, in accordance with an embodiment of the disclosure.

FIG. 2 illustrates an ingestion process for ingesting data from the planning database structure, in accordance with an embodiment of the disclosure. As is illustrated, the ingestion process is the process used for ingesting the data from planning database structure (for example, geographical information system (GIS)).

In an aspect, at 202, a planning system provides the data that is to be indigested. This results in producing broadly two types of data. First is site-related information (data), which is in a structured format and may be stored in a relational database. Second is map data produced by the GIS and includes data such as administrative boundaries for state, district, cluster, and point of interest (POI) data, and the like. All such datasets are pre-processed and stored in appropriate (non-relational) databases.

In an aspect, at 204, the data provided by the planning system is checked to see if the data is site-related data; if yes, then at 206, the site data is pre-processed.

In an aspect, at 208, the pre-processed data is saved to the relational databases.

In an aspect, at 210, the data is further stored in a centralized network master database lake.

In an aspect, at 212, the data provided by the planning system is checked if the data is a map data. For example, map data may be polygon data, point of interest (POI) data, or polyline data.

In an aspect, at 214, if step 212 is affirmative (yes), then the map data is pre-processed.

In an aspect, at 216 the pre-processed map data may get stored in non-relational databases that is further stored at the centralized network master database lake.

Figure 3:
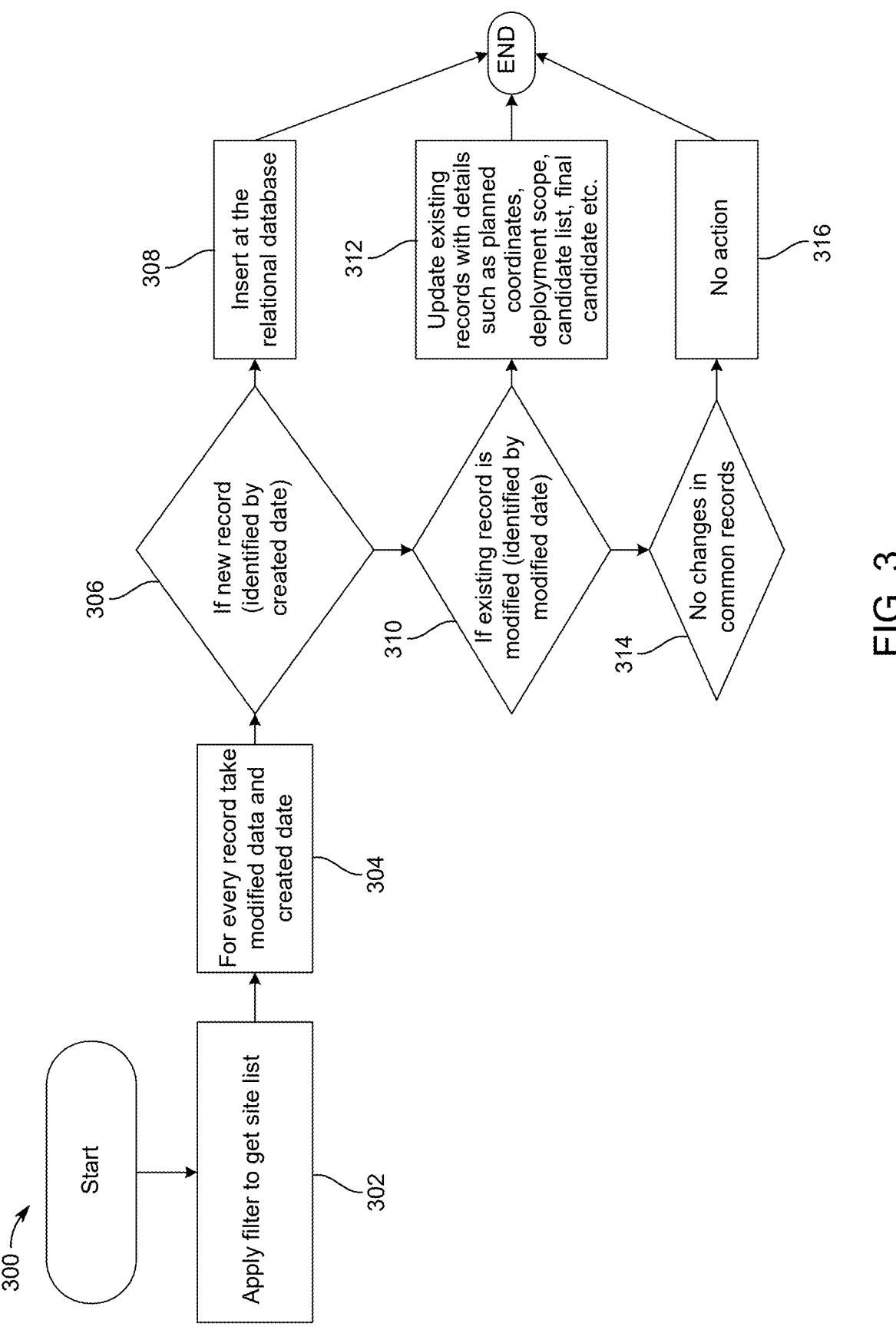
FIG. 3 illustrates a subprocess for preprocessing site data, in accordance with an embodiment of the disclosure.

FIG. 3 illustrates a subprocess for preprocessing site data (300), in accordance with an embodiment of the disclosure.

In an aspect, at 302, a filter is applied to the site data to obtain the site list for deployment scope.

In an aspect, at 304, for every record of the site list, determine a modified date and a created date.

In an aspect, at 306, it is checked if a new record is identified by the created date.

In an aspect, at 306, if a new record is identified by the created date, then the record of the site list is inserted at the relational database.

In an aspect, at 310, it is checked if the existing record is modified only i.e., identified by modified date.

In an aspect, at 312, when the existing record is modified i.e., identified by modified date, then the existing records with details (such as planned coordinates, deployment scope, candidate list, final candidate etc) are updated.

In an aspect, at 314 when the existing record is not modified then it is concluded that there are no changes in common records then at 316, no action is taken.

Figure 4:
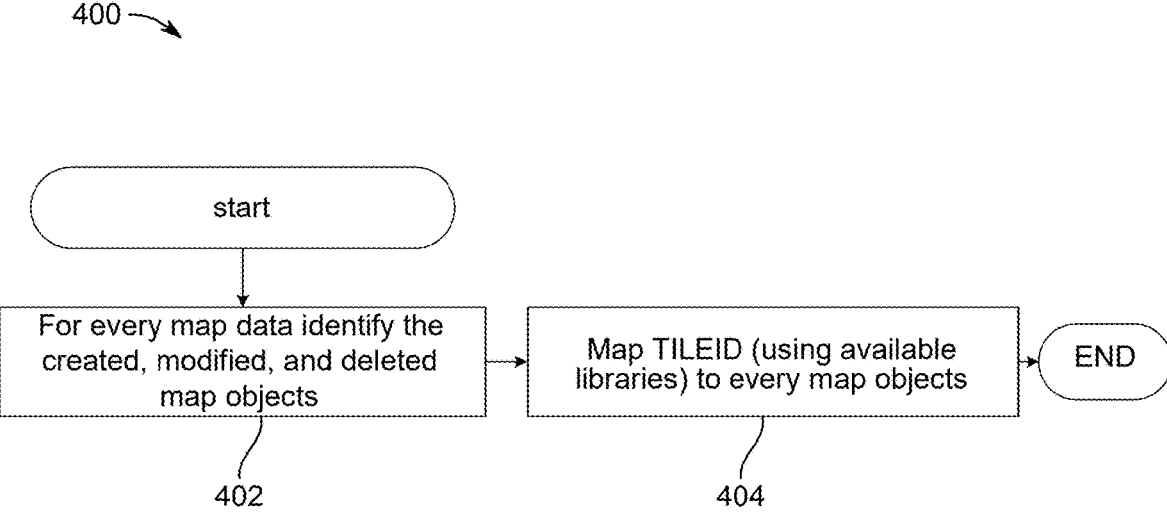
FIG. 4 illustrates a subprocess for preprocessing map data, in accordance with an embodiment of the disclosure.

FIG. 4 illustrates a subprocess (400) for preprocessing map data, in accordance with an embodiment of the disclosure.

In an aspect, at 402, for every map data (i.e., boundary data, POI data, or polylines data), created, modified, and deleted map objects are identified.

In an aspect, at 404, TILEID is mapped to every map object for efficient map visualization use cases. The TILEID is determined using a plurality of available libraries.

Figure 5:
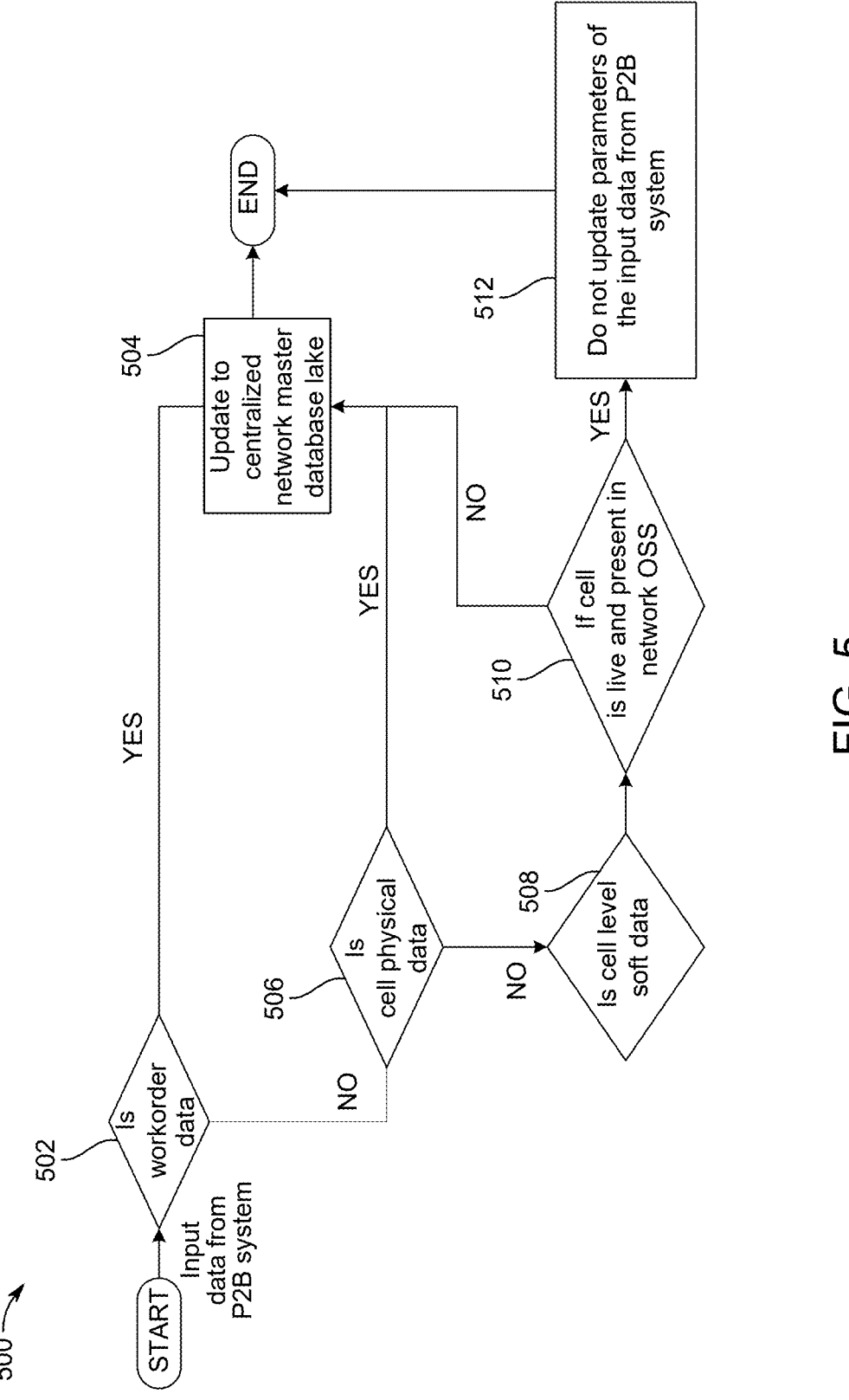
FIG. 5 illustrates an ingestion process from Plan to build (P2B) system in accordance with an embodiment of the disclosure.

FIG. 5 illustrates an ingestion process (500) from the P2B system in accordance with an embodiment of the disclosure. The P2B system is configured to manage input data that is categorized into work order data and cell data. In an aspect, the workorder data may include workorder related details of the site data. Every attribute is either site related, or cell related. After a node related input data is received from the planning structure, if for that site, a deployment process starts, data for that node may start appearing in the P2B systems. In an aspect, all the input data from the P2B system may be categorized into two parts:

a) Workorder details (data): This is mainly a site level data. For one site identifier (ID), there is one workorder and that workorder contains multiple tasks such as "Installation", "Commissioning", "Acceptance", etc. Such details are exclusively present in any P2B system, so it is optimal to keep all such attributes under separate logical grouping.

b) Cell level parameters (data): The cell level parameters comprise physical attributes such as tilt, azimuth, antenna model, and height, and soft attributes such as PCI, RC Power, TAC, CellID, Mobile country code (MCC), Mobile network code (MNC), Absolute radio frequency channel number (ARFCN). While physical parameters come exclusively from the P2B system, but soft parameters come from the network OSS structure as well. So, logic needs to be applied for such soft parameters to decide the final source of the same attribute if available from both systems (i.e., P2B system and network OSS).

According to FIG. 5, at 502, the input data from the P2B system is checked if it is a workorder data, if yes, at 504, the workorder data is updated to the centralized network master database lake. At 506, when 502 is not affirmative, it is checked if the data is a cell physical data, if yes, then an update to centralized network master database lake is performed. However, at 508, when 506 is not affirmative, it is checked if the data is a cell level soft data; if yes, then at 510, it is checked if the cell is live and present in network OSS. At 512, if 510 is affirmative, then the parameters from the P2B system are not updated since the same set of parameters may be available from the network OSS. However, when 510 is not affirmative, then the cell soft data is updated to the centralized network master database lake.

Figure 6:
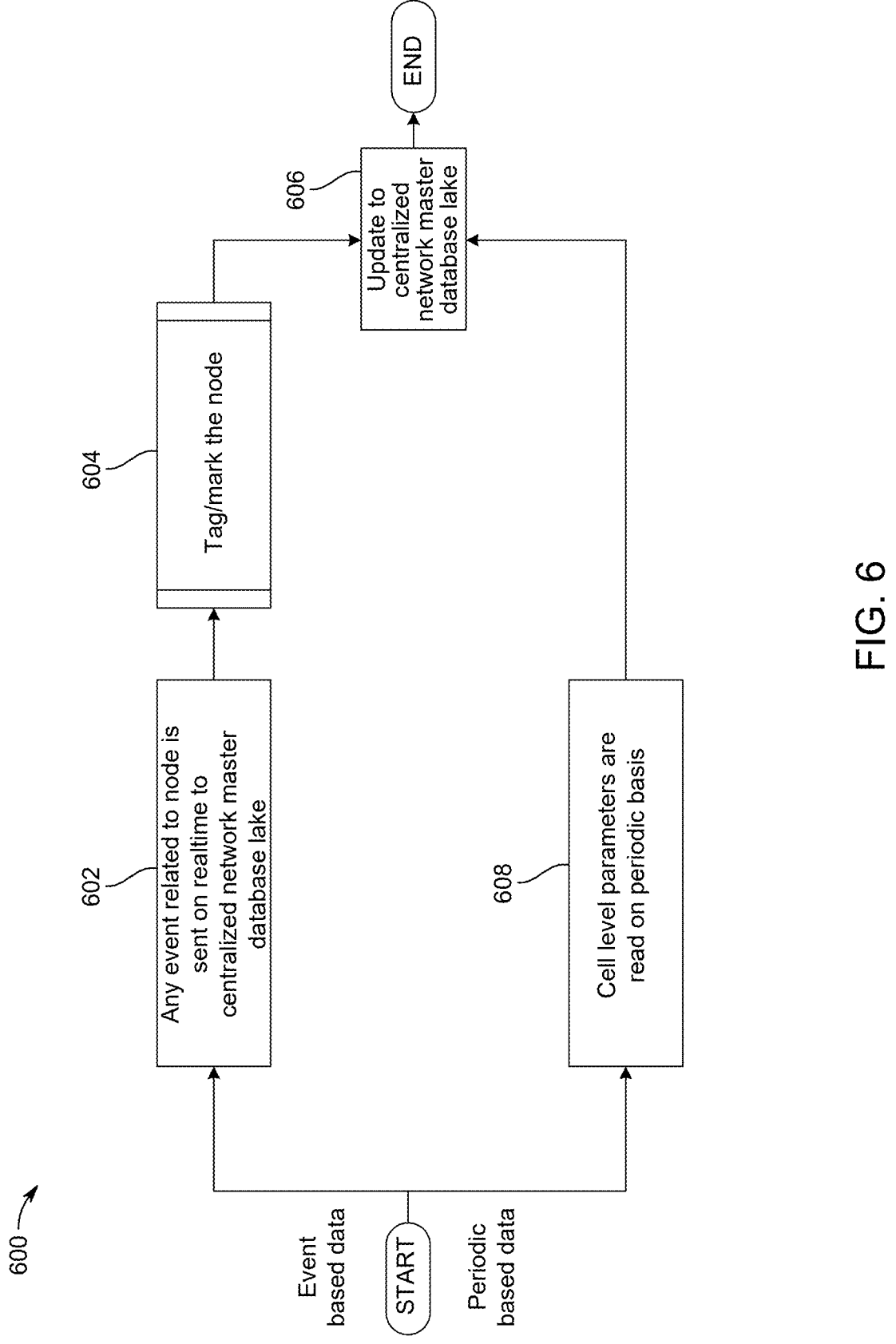
FIG. 6 illustrates an ingestion process from the network operations support systems (OSS) structures, in accordance with an embodiment of the disclosure.

FIG. 6 illustrates an ingestion process from the network OSS structures (600), in accordance with an embodiment of the disclosure. The network OSS (or EMS) refers to a controller of all live sites. In any OEM deployment, all nodes are grouped and controlled by one master or group of masters for the purpose of operations and management. Once the site is up and radiating, then the network OSS may give visibility on all site/cell level parameters through KPIs and configuration parameters. A node that may belong to any OEM may have thousands of parameters, and fetching all the parameters from the network OSS in real time may cause increased processing on the network OSS as well as on the client system. To avoid this, a key set of parameters and their required frequency is selected. The input data can be event-based data or periodic-based data. At 602, for the event-based data, any event of node addition, deletion, up, or down is sent in real-time to the centralized network master database lake data. At 604, a logic is applied on the node details received from the EMS to mark it as ONAIR or Non radiating. At 606, the marked node details are updated to the centralized network master database lake. At 608, when the input data is periodic data, then cell-level parameters such as CellID, PCI, TAC, etc, are read on a periodic basis and are updated to the centralized network master database lake. Thus, the centralized network master database lake gets enriched on a periodic basis with all the input data.

a) Real time required fields: Node up status, Node down status, Trigger if node is created in the EMS, Trigger if node is deleted in the EMS. The presence of these real time inputs keeps centralized network master database lake up to date with respect to the node status. Further, in an aspect, an additional logic may get applied on raw input data from the OSS to derive the correct node status.

b) Non-Real time inputs (on a periodic basis): Attributes such as CELLID, PCI, TAC, node IP, hostname, virtual local area network (VLAN) details, etc., are part of the non-real-time categories of inputs. The centralized network master database lake gets enriched on a periodic basis with all the inputs.

Figure 7:
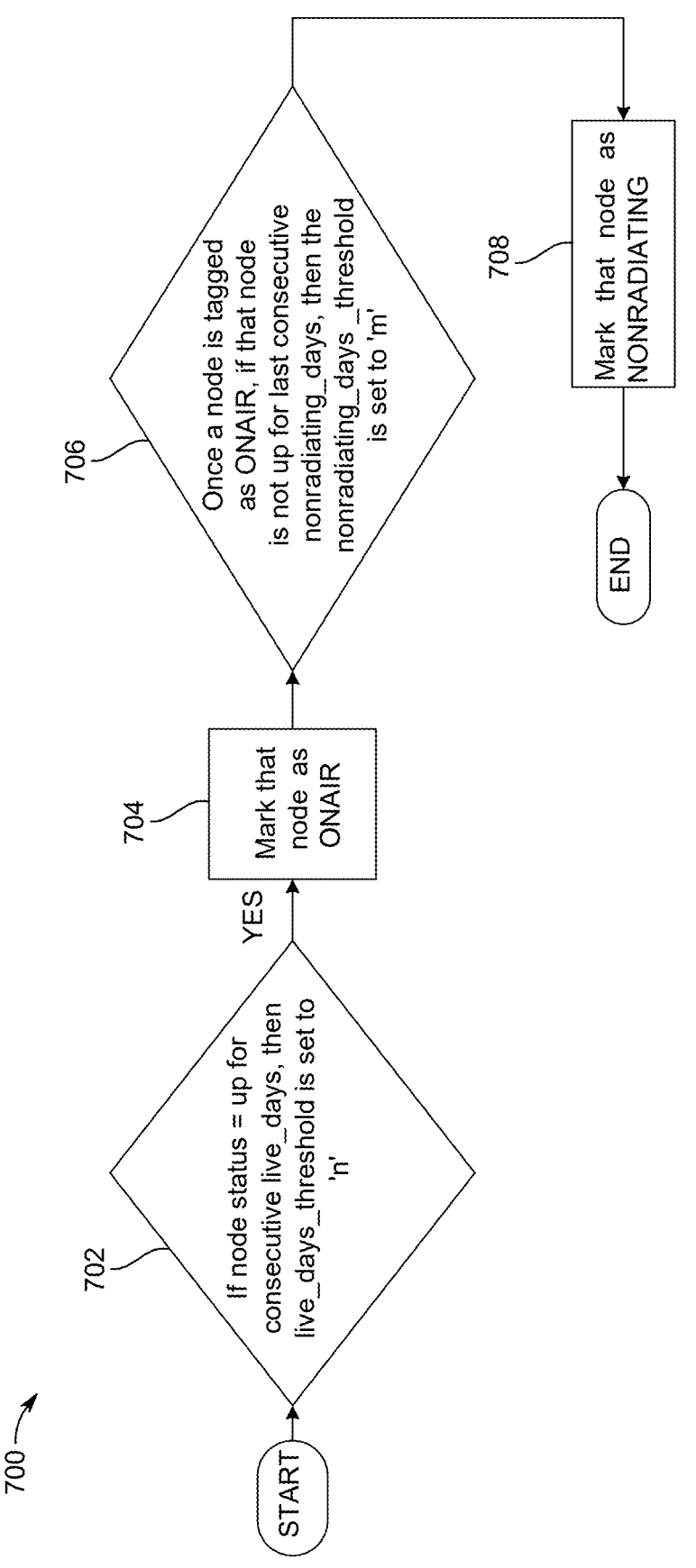
FIG. 7 illustrates a logic for tagging a node, in accordance with an embodiment of the disclosure.

FIG. 7 illustrates a logic (700) for tagging the node as ONAIR and NONRADIATING, in accordance with an embodiment of the disclosure. As is illustrated, at 702, if node status=up for consecutive live_days, then live_days_threshold (e.g., admin controlled) may be set to 'n'. In an aspect, 'n' may be equal to 1. In an aspect at 704, the node is marked as ONAIR. Further, at 706, once a node is tagged as ONAIR if that node is not up for the last consecutive nonradiating_days, then the nonradiating_days_threshold (e.g., admin controlled) may be set to 'm'. In an aspect 'm' may be equal to 30 and at 708, the node is marked as NONRADIATING.

In an embodiment, the following are the disclosed database selections approach of the centralized network master database lake:

SITE LEVEL TABLES—Relational databases used to store the site level details such as coordinate, address, geography tagging such as circle, city, village, morphology, etc.

BAND LEVEL TABLES—Relational databases used to store band level details such as number of cells in that band, workorder detail if present band wise, etc.

CELL LEVEL PM TABLES—Relational databases are used to store the daily traffic carrying status of every cell.

CELL LEVEL CONFIG TABLES—Relational databases are used to store cell level soft parameters received from CM.

GEOSPATIAL DATA—Non-Relational databases used to store boundaries such as circle boundary, state boundary, cluster boundary, etc.

Figure 8:
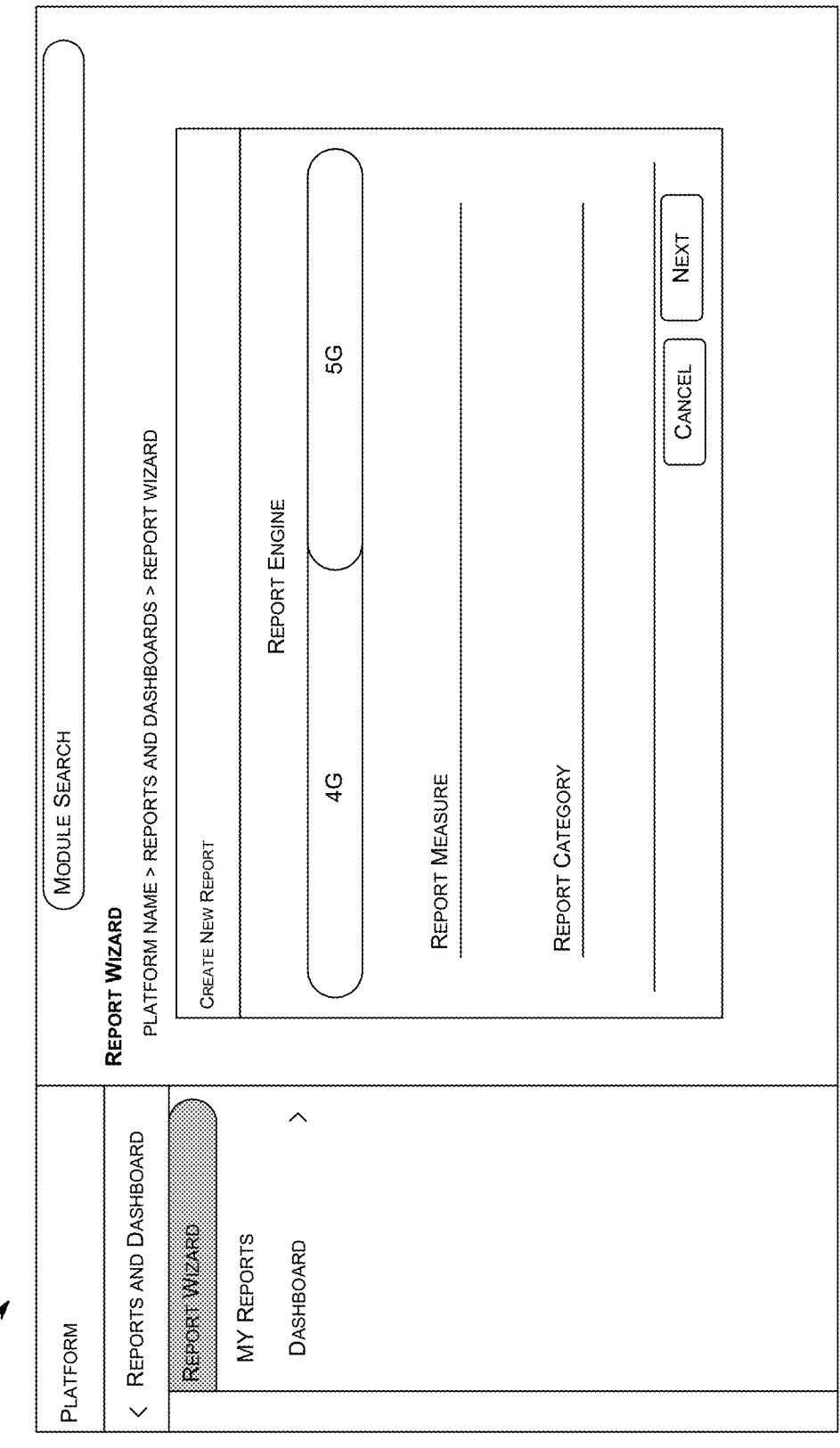
FIG. 8 illustrates an exemplary use case scenario showing a reporting wizard tool inside a web application to fetch the data, in accordance with an embodiment of the disclosure.

FIG. 8 illustrates an exemplary use case scenario (800) showing a report wizard tool inside a web application to fetch the data, in accordance with an embodiment of the disclosure. The reports and dashboard have a "Report wizard" where the reports can be seen under "My reports". The dashboard having an option to create a new report that further having a report engine having select option for "4G or "5G" reports and "Report measure" and "Report category" options. Enriched data in the centralized network master database lake may be potentially used for a variety of use cases. In an aspect, the report wizard mat includes a "Module search".

In an aspect, one of the use cases is that of a reporting framework. Here all datasets may be exported by the user from a report wizard in the web application.

In an aspect, next use case is that of performing advanced analytics through the BI tools. As is shown in FIG. 9 is a dashboard (900) created on datasets from the centralized network master database lake, in accordance with an embodiment of the disclosure. Any Business Intelligence (BI) platform may be integrated with the centralized network master database lake. Further, supersets are integrated for doing analytics on the centralized network master database lake. The dashboard has details of the reports where either a value can be selected or typed. A selection may be made on details such as "Owner", "Created by", "Status", "Favorite", and "Certified" etc. A search may be made on "Snapshot" (e.g., 4G macro sites, Wi-Fi, 5G site summary etc.). Further, details such as "Title" "Modified by" (e.g., name of the person)", "Status" (e.g., Published/Draft)", "Modified by" (e.g., number of days/months, 2 days ago, a month ago etc), "Created by" (e.g., name of the person)", owners etc is also provided in the dashboard.

Figure 10:
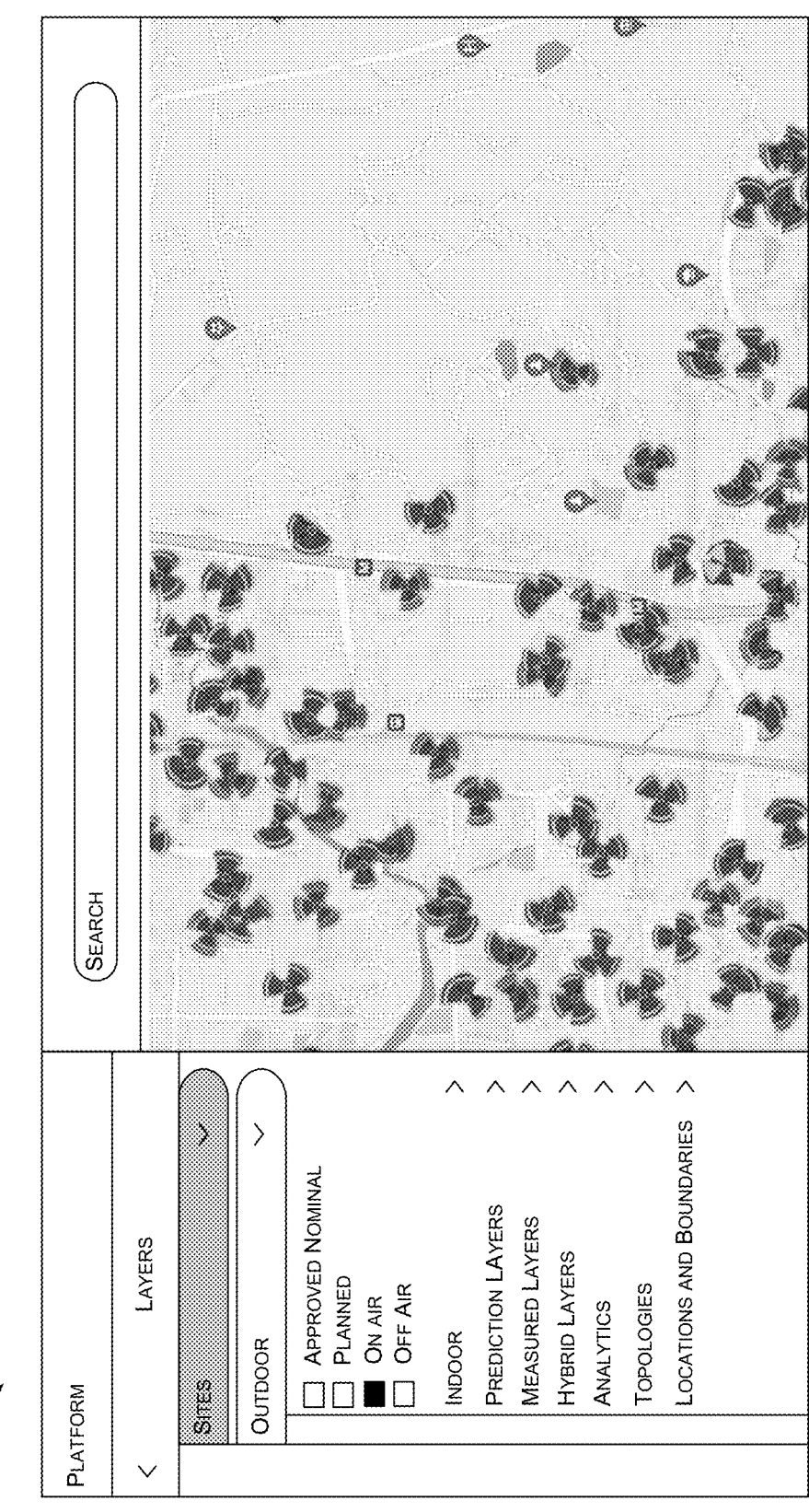
FIG. 10 illustrates a map showing site and coverage view, in accordance with an embodiment of the disclosure.

FIG. 10 illustrates the map (1000) showing site and coverage view, in accordance with an embodiment of the disclosure. Once the data is available in the centralized network master database lake, the same is rendered for providing an updated network view. The platform includes multiple layers such as "Sites". When "Outdoor" under "Sites" is selected a plurality of options such as "Approved nominal", Planned", On Air, Off Air are available for further selection. Further, other multiple layers such as "Indoor", "Prediction layer", "Measured layer", "Hybrid layer", "Analytics, "Topologies" and "Locations and Boundaries" are also available for the selection.

The disclosed system and method facilitate to categorize the planning datasets into the site level and the map data and is used to categorize the dataset from P2B system into Workorder data and Cell data. Further, is performed classification of all external systems into three domains i.e., the planning, the deployment and the network OSS. In addition, is provided a 360-degree view on the database centralized network master database lake using reporting, the BI tools and the map view. In an embodiment, the data is getting categorized using data attributes. For example, if the input data contains latitude, longitudes, then the input data is categorized as map related data and if the input data contains site identifiers (IDs), then the input data is categorized into the site related data.

The disclosed system and method enable the creation of a centralized network master database lake by selecting the most crucial data from external sources, which allows the implementation with minimum resources by providing all key datasets in a single platform to an engineer thereby easing out development of other automation use cases.

As may be appreciated, the disclosed system and method may be used by internal radio-access network (RAN) teams directly or indirectly. Apart from front end direct user, creation of such centralized network master database lakes eases out development work for other features, which requires up to date network information. The centralized network master database lake may be used for external clients, if required.

Figure 11:
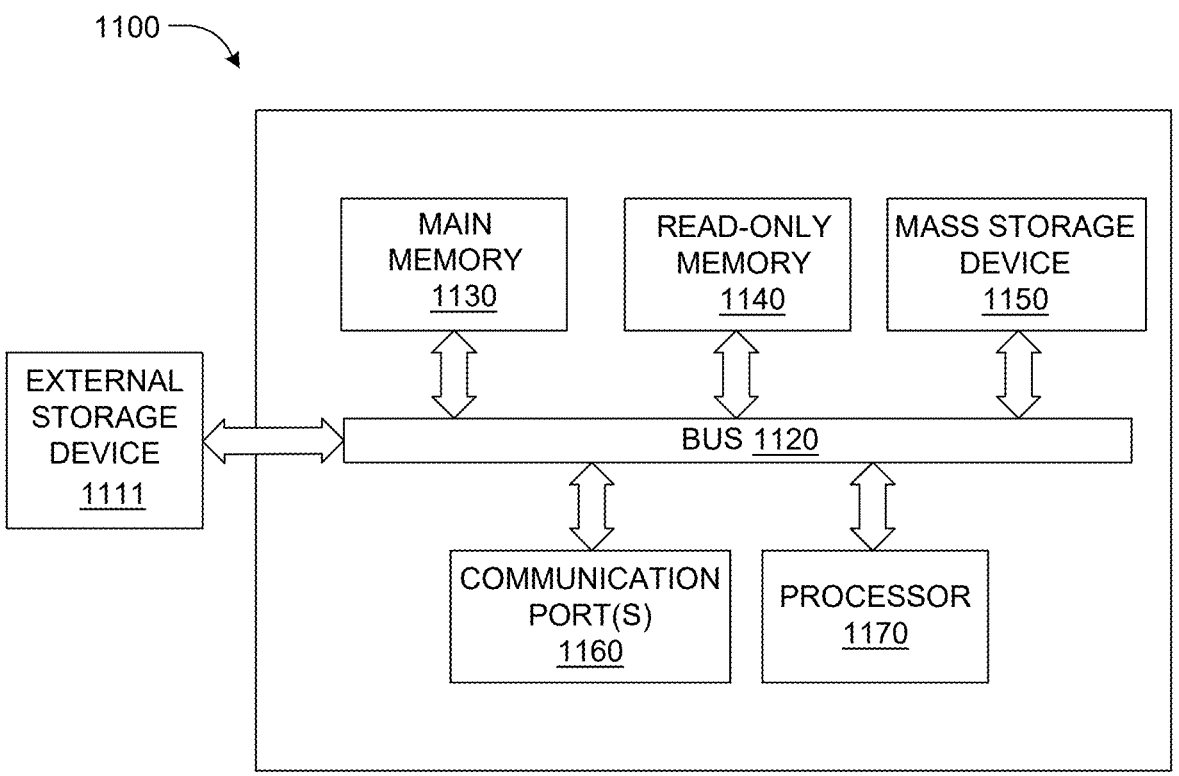
FIG. 11 illustrates an exemplary computer system in which or with which embodiments of the present disclosure may be implemented.

FIG. 11 illustrates an exemplary computer system 1100 in which or with which embodiments of the present disclosure may be implemented. As shown in FIG. 11, the computer system 1100 may include an external storage device 1110, a bus 1120, a main memory 1130, a read-only memory 1140, a mass storage device 1150, communication port(s) 1160, and a processor 1170. A person skilled in the art will appreciate that the computer system 1100 may include more than one processor and communication ports. The processor 1170 may include various modules associated with embodiments of the present disclosure. The communication port(s) 1160 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 1160 may be chosen depending on a network, such a Local Area Network (LAN), Wide Area Network (WAN), or any network to which the computer system 1100 connects.

The main memory 1130 may be random access memory (RAM), or any other dynamic storage device commonly known in the art. The read-only memory 1140 may be any static storage device(s) e.g., but not limited to, a Programmable read only memory (PROM) chips for storing static information e.g., start-up or basic input/output system (BIOS) instructions for the processor 1170. The mass storage device 1150 may be any current or future mass storage solution, which can be used to store information and/or instructions. Exemplary mass storage device 1150 includes, but is not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), one or more optical discs, Redundant Array of Independent Disks (RAID) storage, e.g. an array of disks.

The bus 1120 communicatively couples the processor 1170 with the other memory, storage, and communication blocks. The bus 1120 may be, e.g. a Peripheral Component Interconnect (PCI)/PCI Extended (PCI-X) bus, Small Computer System Interface (SCSI), Universal Serial Bus (USB), or the like, for connecting expansion cards, drives, and other subsystems as well as other buses, such a front side bus (FSB), which connects the processor 1170 to the computer system 1100.

Optionally, operator and administrative interfaces, e.g. a display, keyboard, joystick, and a cursor control device, may also be coupled to the bus 1120 to support direct operator interaction with the computer system 1100. Other operator and administrative interfaces can be provided through network connections connected through the communication port(s) 1160. Components described above are meant only to exemplify various possibilities. In no way should the aforementioned exemplary computer system 1100 limit the scope of the present disclosure.

FIG. 12 illustrates an exemplary flow diagram for a method 1200 for providing a centralized network master database lake.

At step 1202, the method discloses receiving a plurality of input data from a plurality of data sources.

At step 1203, the method discloses storing the input data in a database.

At step 1204, the method discloses receiving the plurality of input data from the database.

At step 1206, the method discloses identifying a plurality of attributes associated with the plurality of input data.

At step 1208, the method discloses processing, based on the plurality of attributes, the plurality of input data to determine the plurality of data sources associated with the plurality of input data.

At step 1210, the method discloses processing the plurality of input data to categorize the plurality of input data into a plurality of predefined data categories.

At step 1212, the method discloses processing the categorized plurality of input data to determine if a record associated with the categorized plurality of input data exist in the centralized network master database lake.

At step 1214, the method discloses updating the record with the categorized plurality of input data when it is determined that the record exists.

At step 1216, the method discloses creating a new record to store the categorized plurality of input data into the centralized network master database lake when it is determined that the record does not exist.

At step 1218, the method discloses processing the record to dynamically display the categorized plurality of input data. In an aspect, once the data is available in the centralized network master database lake, the same is rendered for providing an updated network view. Another sample use case is that of a reporting framework. Here all datasets may be exported by the user from a reporting portal (wizard) in the web application. The next sample use case is that of performing advanced analytics through business intelligence (BI) tools. Any BI platform may be integrated with the centralized network master database lake.

In an exemplary embodiment, the present invention discloses a system for providing a centralized network master database lake. The system comprising a receiving unit configured to receive a plurality of input data from a plurality of data sources. The system comprising a database configured to store the plurality of input data. The system comprising a processing unit configured to receive the plurality of input data from the database. The processing unit is configured to identify a plurality of attributes associated with the plurality of input data; process, based on the plurality of attributes, the plurality of input data to determine the plurality of data sources associated with the plurality of input data. Process the plurality of input data to categorize the plurality of input data into a plurality of predefined data categories. Process the categorized plurality of input data to determine if a record associated with the categorized plurality of input data exist in the centralized network master database lake. Update the record with the categorized plurality of input data when it is determined that the record exists. Create a new record to store the categorized plurality of input data into the centralized network master database lake when it is determined that the record does not exist and process the record to dynamically display the categorized plurality of input data.

In some embodiments, the plurality of input data is categorized as site-related data or as map-related data when a data source from the plurality of data sources is a planning database.

In some embodiments, when the plurality of input data is categorized as site-related data, then performing the following steps: preprocessing (e.g., filtering) the site-related data, storing the pre-processed site-related data in at least one relational database, and storing the pre-processed site-related data in the centralized network master database lake.

In some embodiments, when the plurality of input data is categorized as the map related data, then performing the following steps: pre-processing the map-related data, storing the pre-processed map-related data in at least one non-relational database, and storing the pre-processed map-related data in the centralized network master database lake.

In some embodiments, the system is further configured to filter the site related data to get a site list comprising a plurality of site records.

In some embodiments, the system is further configured to determine a modified date and a created date for every site record in the site list.

In some embodiments, the system is further configured to identify a modified site record and a new site record from the site list based on the determined modified date and the determined created date respectively.

In some embodiments, the system is further configured to determine an existing site record from the site related data associated with the identified modified site record.

In some embodiments, the system is further configured to update the determined existing site record with details of the modified site record.

In some embodiments, the system is further configured to insert the identified new site record in the at least one relational database.

In some embodiments, the system is further configured to categorize the plurality of input data as a workorder data or as a cell data when a data source from the plurality of data sources is a plan to build (P2B) system.

In some embodiments, the system is further configured to determine if the cell data is cell physical data or cell-level soft data.

In some embodiments, the system is further configured to update the centralized network master database lake with the workorder data and the cell physical data.

In some embodiments, the system is further configured to update the centralized network master database lake with the cell level soft data when it is determined that a cell associated with the cell level soft data is not active and not present in a network operations support system (OSS).

In some embodiments, the plurality of input data is categorized as an event-based data or as a periodic based data when a data source from the plurality of data sources is the network OSS.

In an exemplary embodiment, the present invention discloses a method for providing a centralized network master database lake. The method includes receiving a plurality of input data from a plurality of data sources by a receiving unit. The method includes storing the input data in a database. The method includes receiving the plurality of input data from the database by a processing unit. The method includes identifying a plurality of attributes associated with the plurality of input data. The method includes processing, based on the plurality of attributes, the plurality of input data to determine the plurality of data sources associated with the plurality of input data. The method includes processing the plurality of input data to categorize the plurality of input data into a plurality of predefined data categories. The method includes processing the categorized plurality of input data to determine if a record associated with the categorized plurality of input data exist in the centralized network master database lake. The method includes updating the record with the categorized plurality of input data when it is determined that the record exists. The method includes creating a new record to store the categorized plurality of input data into the centralized network master database lake when it is determined that the record does not exist. The method includes processing the record to dynamically display the categorized plurality of input data.

In an embodiment, the plurality of input data is categorized as a site related data or as a map related data when a data source from the plurality of data sources is a planning database.

In an embodiment, when the plurality of input data is categorized as the site related data, then performing the following steps: preprocessing the site related data, storing the pre-processed site related data in at least one relational database and storing the pre-processed site related data in the centralized network master database lake.

In an embodiment, when the plurality of input data is categorized as the map related data, then performing the following steps: preprocessing the map related data storing the pre-processed map related data in at least one non-relational database and storing the pre-processed map related data in the centralized network master database lake.

In an embodiment, the method further comprising filtering the site related data to get a site list comprising a plurality of site records.

In an embodiment, the method further comprising determining a modified date and a created date for every site record in the site list.

In an embodiment, the method further comprising identifying a modified site record and a new site record from the site list based on the determined modified date and the determined created date respectively.

In an embodiment, the method further comprising determining an existing site record from the site related data associated with the identified modified site record.

In an embodiment, the method further comprising updating the determined existing site record with details of the modified site record.

In an embodiment, the method further comprising inserting the identified new site record in the at least one relational database.

In an embodiment, the method further comprising categorizing the plurality of input data as a workorder data or as a cell data when a data source from the plurality of data sources is a plan to build (P2B) system.

an embodiment, the method further comprising determining if the cell data is a cell physical data or a cell level soft data.

In an embodiment, the method further comprising updating the centralized network master database lake with the workorder data and the cell physical data.

In an embodiment, the method further comprising updating the centralized network master database lake with the cell level soft data when it is determined that a cell associated with the cell level soft data is not active and not present in a network operations support system (OSS).

In an embodiment, the plurality of input data is categorized as an event based data or as a periodic based data when a data source from the plurality of data sources is the network OSS.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

ADVANTAGES OF THE PRESENT DISCLOSURE

The present disclosure facilitates to improve network operations by using a centralized network data master database.

The present disclosure enables the integration of planning structure, work order structure, and network OSS in a single module.

The present disclosure categorizes planning structures into site level and map data.

The present disclosure is used to categorize Plan to Build (P2B) system into workorder data and cell data.

The present disclosure provides a 360-degree view of a centralized network master database lake using reporting, Business Intelligence (BI) tools, and a map view.

The present disclosure is used in a commercial network having multiple nodes and involving multi-vendor, multi-technology scenarios.

The present disclosure improves network operations by creating a centralized network data master database by tapping crucial data from multiple external sources.

The present disclosure provides the centralized network data master database that is used as a base data for empowering features like network view for sites and coverage for managing the network.

The present disclosure provides the centralized network data master database that acts as a platform for performing analytics functions and building use cases.

The present disclosure provides various databases in a single platform and ease development of automation use cases.

We claim:

1. A system (118) for providing a centralized network master database lake (128), the system comprising:
   a receiving unit (120) configured to receive a plurality of input data from a plurality of data sources (116);
   a database (124) configured to store the plurality of input data;
   a processing unit (122) configured to receive the plurality of input data from the database (124);
   the processing unit (122) is configured to:
       identify a plurality of attributes associated with the plurality of input data;

process the plurality of input data to categorize the plurality of input data into a plurality of predefined data categories based on the plurality of attributes;
   process the categorized plurality of input data to determine if a record associated with the categorized plurality of input data exists in the centralized network master database lake (128);
   update the record with the categorized plurality of input data when it is determined that the record exists;
   create a new record to store the categorized plurality of input data into the centralized network master database lake (128) when it is determined that the record does not exist; and
   process the records to dynamically display the categorized plurality of input data.

2. The system (118) as claimed in claim 1, wherein the plurality of input data is categorized as a site related data or as a map related data when a data source from the plurality of data sources is a planning database.

3. The system (118) as claimed in claim 2, wherein when the plurality of input data is categorized as the site related data, then performing the following steps:
   preprocessing the site related data;
   storing the preprocessed site related data in at least one relational database; and
   storing the preprocessed site related data in the centralized network master database lake (128).

4. The system (118) as claimed in claim 2, wherein when the plurality of input data is categorized as the map related data, then performing the following steps:
   preprocessing the map related data;
   storing the preprocessed map related data in at least one non-relational database; and
   storing the preprocessed map related data in the centralized network master database lake (128).

5. The system (118) as claimed in claim 3, further configured to:
   filter the site related data to get a site list comprising a plurality of site records;
   determine a modified date and a created date for every site record in the site list;
   identify a modified site record and a new site record from the site list based on the determined modified date and the determined created date respectively;
   determine an existing site record from the site related data associated with the identified modified site record;
   update the determined existing site record with details of the modified site record; and
   insert the identified new site record in the at least one relational database.

6. The system (118) as claimed in claim 1, further configured to:
   categorize the plurality of input data as a workorder data or as a cell data when a data source from the plurality of data sources is a plan to build (P2B) system;
   determine if the cell data is a cell physical data or a cell level soft data;
   update the centralized network master database lake (128) with the workorder data and the cell physical data; and
   update the centralized network master database lake (128) with the cell level soft data when it is determined that a cell associated with the cell level soft data is not active and not present in a network operations support system (OSS).

7. The system (118) as claimed in claim 1, wherein the plurality of input data is categorized as an event based data or as a periodic based data when a data source from the plurality of data sources is the network OSS.

8. A method (1200) for providing a centralized network master database lake (128), the method (1200) comprising:

receiving (1202) a plurality of input data from a plurality of data sources (116) by a receiving unit (120);

storing (1203) the plurality of input data into a database (124);

receiving (1204) the plurality of input data from the database (124) by a processing unit (122);

identifying (1206) a plurality of attributes associated with the plurality of input data;

processing (1210) the plurality of input data to categorize the plurality of input data into a plurality of predefined data categories based on the plurality of attributes;

processing (1212) the categorized plurality of input data to determine if a record associated with the categorized plurality of input data exists in the centralized network master database lake (128);

updating (1214) the record with the categorized plurality of input data when it is determined that the record exists;

creating (1216) a new record to store the categorized plurality of input data into the centralized network master database lake (128) when it is determined that the record does not exist; and processing (1218) the record to dynamically display the categorized plurality of input data.

9. The method (1200) as claimed in claim 8, wherein the plurality of input data is categorized as a site related data or as a map related data when a data source from the plurality of data sources is a planning database.

10. The method (1200) as claimed in claim 9, wherein when the plurality of input data is categorized as the site related data, then performing the following steps:

preprocessing the site related data;

storing the preprocessed site related data in at least one relational database; and storing the preprocessed site related data in the centralized network master database lake (128).

11. The method (1200) as claimed in claim 9, wherein when the plurality of input data is categorized as the map related data, then performing the following steps:

preprocessing the map related data;

storing the preprocessed map related data in at least one non-relational database; and storing the preprocessed map related data in the centralized network master database lake (128).

12. The method (1200) as claimed in claim 10, further comprising:

filtering the site related data to get a site list comprising a plurality of site records;

determining a modified date and a created date for every site record in the site list;

identifying a modified site record and a new site record from the site list based on the determined modified date and the determined created date respectively;

determining an existing site record from the site related data associated with the identified modified site record;

updating the determined existing site record with details of the modified site record; and inserting the identified new site record in the at least one relational database.

13. The method (1200) as claimed in claim 8, further comprising:

categorizing the plurality of input data as a workorder data or as a cell data when a data source from the plurality of data sources is a plan to build (P2B) system;

determining if the cell data is a cell physical data or a cell level soft data;

updating the centralized network master database lake (128) with the workorder data and the cell physical data; and updating the centralized network master database lake (128) with the cell level soft data when it is determined that a cell associated with the cell level soft data is not active and not present in a network operations support system (OSS).

14. The method (1200) as claimed in claim 8, wherein the plurality of input data is categorized as an event based data or as a periodic based data when a data source from the plurality of data sources is the network OSS.

15. A computer program product comprising a non-transitory computer-readable medium comprising instructions that, when executed by one or more processors, cause the one or more processors to perform a method for providing a centralized network master database lake (128), the method comprising:

receiving (1202) a plurality of input data from a plurality of data sources (116) by a receiving unit (120);

storing (1203) the plurality of input data into a database (124);

receiving (1204) the plurality of input data from the database (124) by a processing unit (122);

identifying (1206) a plurality of attributes associated with the plurality of input data;

processing (1210) the plurality of input data to categorize the plurality of input data into a plurality of predefined data categories based on the plurality of attributes;

processing (1212) the categorized plurality of input data to determine if a record associated with the categorized plurality of input data exist in the centralized network master database lake (128);

updating (1214) the record with the categorized plurality of input data when it is determined that the record exists;

creating (1216) a new record to store the categorized plurality of input data into the centralized network master database lake (128) when it is determined that the record does not exist; and processing (1218) the record to dynamically display the categorized plurality of input data.

* * * * *